(12) United States Patent
Kuromaru et al.

(10) Patent No.: US 7,676,527 B2
(45) Date of Patent: *Mar. 9, 2010

(54) PROCESSOR

(75) Inventors: Shunichi Kuromaru, Fukuoka (JP); Koji Okamoto, Fukuoka (JP); Junji Michiyama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1484 days.

This patent is subject to a terminal disclaimer.

(21) Appl. No.: 10/998,012

(22) Filed: Nov. 29, 2004

(65) Prior Publication Data

US 2005/0108307 A1    May 19, 2005

Related U.S. Application Data

(63) Continuation of application No. 10/366,355, filed on Feb. 14, 2003, now Pat. No. 6,901,419, which is a continuation of application No. 09/445,059, filed as application No. PCT/JP98/02493 on Jun. 5, 1998, now Pat. No. 6,535,899.

(30) Foreign Application Priority Data

Jun. 6, 1997  (JP)  .......................... HEI 9-149619

(51) Int. Cl.
*G06F 7/00*  (2006.01)
(52) U.S. Cl. ................ 708/200; 708/209; 341/67
(58) Field of Classification Search ............. 708/209
See application file for complete search history.

(56) References Cited

U.S. PATENT DOCUMENTS 4,139,899 A    2/1979   Tulpule et al.

(Continued)

FOREIGN PATENT DOCUMENTS

JP    5-20029     1/1993
JP    7-210382    8/1995

OTHER PUBLICATIONS

European Office Action issued Jul. 14, 2008 in European Application No. 98 923 137.8.

(Continued)

*Primary Examiner*—Lewis A Bullock, Jr.
*Assistant Examiner*—Michael Yaary
(74) *Attorney, Agent, or Firm*—Wenderoth, Lind & Ponack, L.L.P.

(57) ABSTRACT

The present invention provides an arithmetic unit comprising an input register for storing externally input digital data as a P-bit digital data, an output register for storing a Q-bit digital data, and an output bit selecting means. The output bit selecting means is operable to receive the P-bit digital data which is output from the input register as a first input data, and the Q-bit digital data which is output from the output register as a second input data. The output big selecting means is further operable to select bits, values of which bits are to be output, among bits of the first input data and bits of the second input data, in accordance with a control data which is input from outside. The output bit selecting means is still further operable to output Q-bit digital data comprising the values of the selected bits to the output register. This arithmetic unit is suitable for being employed in an image processing system to perform the multiplexing processing or the demultiplexing processing for codes at high speeds.

8 Claims, 14 Drawing Sheets

U.S. PATENT DOCUMENTS

| | | |
|---|---|---|
| 4,914,675 A | 4/1990 | Fedele |
| 5,099,445 A * | 3/1992 | Studor et al. ................ 708/209 |
| 5,321,398 A | 6/1994 | Ikeda |
| 5,487,159 A | 1/1996 | Byers et al. |
| 5,671,166 A * | 9/1997 | Omote ....................... 708/209 |
| 5,875,355 A | 2/1999 | Sidwell et al. |
| 6,535,899 B1 | 3/2003 | Kuromaru et al. |

OTHER PUBLICATIONS

L. Howard Pollard, "Computer Design and Architecture", Paragraph 5.1, 1990, Prentice Hall, Englewood Cliffs, US., pp. 194-195.

Hanna et al. "Bit Manipulator" IBM Technical Disclosure Bulletin, IBM vol. 16, No. 6, Nov. 1974, pp. 1575-1576.

* cited by examiner

PROCESSOR

This is a continuation application of U.S. patent application Ser. No. 10/366,355, filed Feb. 14, 2003, now U.S. Pat. No. 6,901,419 which is a continuation application of U.S. patent application Ser. No. 09/445,059, filed Feb. 16, 2000, now U.S. Pat. No. 6,535,899, which is the national stage of international application PCT/JP98/02493, filed Jun. 5, 1998.

TECHNICAL FIELD

The present invention relates to an arithmetic unit and, more particularly, to an arithmetic unit which is used as a signal processor.

BACKGROUND ART

At present, image coding methods such as MPEG1, MPEG2, MPEG4, H. 261, and H.263 are standardized as the International Standards.

FIG. 14 is a block diagram illustrating a structure of an image processing system based on these standards.

In the figure, reference numeral 1 denotes an encoder and numeral 9 denotes a decoder. The encoder 1 comprises an input circuit 2, a discrete cosine transform circuit 3, a quantization circuit 4, a variable-length coding circuit 5, and a bitstream transmitting circuit 6. The decoder 9 comprises a bitstream receiving circuit 10, a variable-length decoding circuit 11, an inverse quantization circuit 12, an inverse discrete cosine transform circuit 13, and an output circuit 14.

In the image processing system constructed as above, in the encoder 1, an image data is initially input from the input circuit 2, the input image data is cosine-transformed by the discrete cosine transform circuit 3, then quantized, and variable-length coded by the variable-length coding circuit 5, to obtain a code of various code length. Then, this code and a code length 7 are output to the bitstream transmitting circuit 6. In the bitstream transmitting circuit 6, the code is subjected to multiplexing using the code length 7 to obtain a bitstream 8 and the bitstream 8 is output to the decoder 9.

In the decoder 9, this output bitstream 8 is received by the bitstream receiving circuit 10, and variable-length decoded and demultiplexed using a code length 16 to obtain an original code 15, by a cooperative operation of the bitstream receiving circuit 10 and the variable-length decoding circuit. This decoded and demultiplexed code 15 is inverse-quantized by the inverse quantization circuit 12 and inverse-discrete-cosine-transformed by the inverse discrete cosine transformation circuit 13 to reproduce an original image data, and the original image data is output from the output circuit 14 to outside.

The multiplexing processing in the bitstream transmitting circuit 6 and the demultiplexing processing in the bitstream receiving circuit 10 are performed by special use arithmetic units or performed by software.

FIGS. 9(a) to 9(c) are diagrams schematically illustrating the multiplexing processing by the prior art software. FIG. 9(a) is a diagram showing masking processing for data of processing unit, which data includes a code in a certain order. FIG. 9(b) is a diagram showing shifting processing for data of processing unit, which data includes a code in a next order. FIG. 9(c) is a diagram showing multiplexing processing for the code in the next order into the code in the certain order.

In FIG. 9(a), numeral 901 denotes an i-th word data including a code(i) having a code length (bit length) of $m_i$ bits. LSB designates a Least Significant Bit and MSB designates a Most Significant Bit, respectively. When a variable-length code is to be subjected to multiplexing, the processing is performed using data of a prescribed bit length, including the variable-length code. This i-th word data represents data of processing unit which is used in that way. In addition, the i-th word data 901 has the code(i) at the end on the MSB side to process the i-th word data from the MSB side.

To perform the multiplexing processing, initially, a masking data 902 which has the same bit length as that of the i-th word data 901 and has "1" values in bits of a part corresponding to the code(i) and "0" values in bits of the other part, is generated.

Then, an OR operation of the generated masking data 902 and the i-th word data 901 is performed, and thereby the masking processing to the i-th word data 901 for making values of bits except the code(i) "0" is performed (903).

Then, as shown in FIG. 9(b), an i+1-th word data 904, which is a processing unit data in the order subsequent to the i-th word data 901 and includes a code(i+1) having a $m_{i+1}$-bit code length, is logically shifted rightward (in a direction from MSB to LSB) by $m_i$ bits which correspond to the bit length of the code(i), thereby moving the code(i+1) into a multiplexing position. Consequently, the i+1-th word data 904 becomes data having "0" values in bits from the end on the MSB side to an mi-th bit and having the code(i+1) in bits subsequent to the $m_i$-th bit (905).

Then, as shown in FIG. 9(c), an OR operation of the i-th word data 903 which is subjected to the masking processing and the i+1-th word data 905 which is subjected to the rightward shifting processing is performed, thereby obtaining data 906 comprising the code(i) being multiplexed with the code (i+1) which is the code in the next order.

By performing the above-described processings successively, a bitstream is generated by successively multiplexing codes which are successively input.

FIGS. 10(a) to 10(c) are diagrams schematically illustrating the prior art demultiplexing processing by software. FIG. 10(a) is a diagram which shows processing of extracting a code in a certain order from a processing unit data. FIG. 10(b) is a diagram which shows shifting processing for a code of a next processing unit data. FIG. 10(c) is a diagram which shows data supplementation for the processing unit data after the code is extracted, from the next processing unit data.

In FIG. 10(a), numeral 911 denotes a j-th word data comprising a code(i) having a $m_i$-bit code length, a code(i+1) having a $m_{i+1}$-bit code length, and a code(i+2)' having a $m_{i+2}'$-bit code length. When the demultiplexing processing is to be performed for a multiplexed code, an input bitstream is temporarily received by an input register, and then processed in a unit of the received bitstream, i.e., in a unit of the bit number of the input register. This j-th word data 911 represents such a processing unit data of a bitstream. In the j-th word data 911, it is assumed that decoding processing is finished for the code(i), and that the code(i+1) is to be decoded next.

To perform this demultiplexing processing, initially, this j-th word data 911 is logically shifted leftward (in a direction from LSB to MSB) by mi bits which correspond to the bit length of the code(i), thereby extracting the code(i). Consequently, the j-th word data has the code(i+1) and the code(i+ 2)' in this order in a part of bits from the end on the MSB side to the $m_{i+1}+m_{i+2}$-th bit, and has values of "0" in bits of the other part (912).

Then, as shown in FIG. 10(b), a j+1-th word data, which is the next processing unit data and comprises a code(i+2)" having a $m_{i+2}"$-bit code length and a code(i+3) having a $m_{i+3}$-bit code length, is logically shifted rightward by $m_{i+1}+m_{i+2}'$ bits. Thereby, the j+1-th word data becomes data having "0" values in bits from the end on the MSB side to the $m_{i+1}+m_{i+2}$-th bit, and having the code(i+2)" and a part of the code(i+3) in bits of the other part (914).

Then, as shown in FIG. 10(*c*), an OR operation of the j-th word data 912 which is subjected to the leftward shifting processing and the j+1-th word data 914 which is subjected to the rightward shifting processing, is performed, thereby obtaining data 914 comprising a part of empty bits generated by extracting the code(i) from the j-th word data 911 being supplemented with a part of the j+1-th word data 915.

By performing above-described processings successively, codes are successively subjected to demultiplexing from the bitstreams which are successively input.

In the above description, descriptions of a process for generating a masking data and a shift value setting and the like, are omitted.

However, the above-described prior art image processing system has the following drawbacks.

The image processing system using MPEG2 image coding method generally requires real time processing, deals with a large quantity of image data, and further has a large market scale. Therefore, a special use arithmetic unit (hardware) enabling high-speed arithmetic processing is used for the multiplexing processing for codes and the demultiplexing processing for codes.

On the other hand, the image processing systems using the image coding methods such as MPEG1, MPEG4, H.261, and H.263 do not have as large a market scale. Therefore, when a special use arithmetic unit is used for the multiplexing processing for codes and the demultiplexing processing for codes, there may be an increase in constraints on cost or availability for constituting the image processing system. On the other hand, when software is employed, plural steps are required for processing data as described with reference to FIGS. 9(*a*), 9(*b*), 10(*a*), and 10(*b*), whereby there arises an increase in the processing time and difficulty in performing the real time processing.

The present invention is made to solve the problems, and it is an objet of the present invention to provide an arithmetic unit able to perform the multiplexing processing for codes and the demultiplexing processing for codes at high speeds and which thereby has versatility.

SUMMARY OF THE INVENTION

An arithmetic unit according to the present invention comprises an input register for storing a digital data which is input from outside, as a P-bit digital data, by replacing a former data with a later data, and outputting the stored P-bit digital data, an output register for receiving a digital data, storing the input digital data as a Q-bit digital data, by replacing a former data with a later data, and outputting the stored Q-bit digital data, and output bit selecting means for receiving the P-bit digital data which is output from the input register as a first input data and the Q-bit digital data which is output from the output register as a second input data, selecting bits, values of which bits are to be output, among bits of the first input data and bits of the second input data, in accordance with a control data which is input from outside, and outputting a Q-bit digital data comprising the values of the selected bits, to the output register. According to this structure, the digital data stored in the output register and the digital data stored in the input register are combined by bit units, in accordance with the control data, and the digital data generated by that combination is output to the output register. Therefore, by controlling the output bit selecting means such that the digital data generated by that combination has values of prescribed bits of the digital data stored in the output register in prescribed bits and values of prescribed bits of the digital data stored in the input register in the other bits, a part comprising prescribed bits of the digital data stored in the input register can be subjected to multiplexing into a part comprising prescribed bits of the digital data stored in the output register, or a part where bits except prescribed bits of the digital data stored in the output register are extracted can be supplemented with a part comprising prescribed bits of the digital data stored in the input register, besides this operation can be performed in one cycle. Consequently, when the arithmetic unit is employed in a coding device or a decoding device in an image processing system, the multiplexing processing or the demultiplexing processing for codes can be performed at high speeds. In addition, by not utilizing the second input data, this arithmetic unit can be employed as a prior art shifter, thereby realizing the versatility.

In addition, according to the present invention, in the improved arithmetic unit, the output bit selecting means uses an integer "m" as the control data, and when the control data is input, the output bit selecting means outputs a digital data comprising bits from an end to a m-th bit, which have values of bits in the same positions of the second input data, respectively, and bits of a m+1-th bit and following, which have values of bits of the first input data being arranged from an end which is in the same position as the Most Significant Bit side or the Least Significant Bit side, respectively in order, as the Q-bit digital data. According to this structure, when the integer "m" is input as the control data, the Q-bit digital data stored in the output register is replaced by keeping the bits from an end to the m-th bit and shifting a part starting from the end on the same side of the digital data stored in the input register by m bits to move the part into the other bits. Consequently, when the arithmetic unit is employed in a coding device in an image processing system, the multiplexing processing for codes can be performed at high speeds.

Further, according to the present invention, in the further improved arithmetic unit, the output bit selecting means outputs digital data comprising bits from the end on the Most Significant Bit side to the m-th bit, which have values of bits in the same positions of the second input data, respectively, and bits of the m+1-th bit and following, which have values of bits of the first input data being arranged from the end on the Most Significant Bit side, respectively in order, as the Q-bit digital data. Therefore, the multiplexing processing for codes from the end on the Most Significant. Bit side can be performed at high speeds.

Further, according to the present invention, in the further improved arithmetic unit, the output bit selecting means outputs digital data comprising bits from the end on the Least Significant Bit side to the m-th bit, which have values of bits in the same positions of the second input data, respectively, and bits of the m+1-th bit and following, which have values of bits of the first input data being arranged from the end on the Least Significant Bit side, respectively in order, as the Q-bit digital data. Therefore, the multiplexing processing for codes from the end on the Least Significant Bit side can be performed at high speeds.

Further, according to the present invention, in the further improved arithmetic unit, the output bit selecting means uses as the control data, an operation mode, a shift direction, and a shift amount, in addition to the integer "m" and when the control data having the operation mode which indicates a mode of performing a first operation and the integer "m" is input, the output bit selecting means performs the above operation, and when the control data having the operation mode which indicates a mode of performing a second operation, the shift direction, and the shift amount is input, the output bit selecting means outputs a digital data which is obtained by shifting values of bits of the first input data in the shift direction and by the shift amount, as the Q-bit digital data. Therefore, by only inputting a prescribed control data, the arithmetic unit can also be employed as a shifter as in the prior art. As a result, the arithmetic unit enabling the high-speed multiplexing processing can be made to have the versatility easily and the shifting operation which is required in the multiplexing processing can be performed.

Further, according to the present invention, in the improved arithmetic unit, the output bit selecting means uses an integer "m" as the control data, and when the control data is input, the output bit selecting means outputs a digital data comprising bits from an end to a Q-m-th bit, which have values of bits of the second input data being arranged starting from a m+1-th bit from an end which is in the same position as the Most Significant Bit side or the Least Significant Bit side, respectively in order, and bits of a Q-m+1-th bit and following, which have values of bits of the first input data being arranged from an end which is in the same position as the Most Significant Bit side or the Least Significant Bit side, respectively in order, as the Q-bit digital-data. According to this structure, when the integer "m" is input as the control data, the Q-bit digital data stored in the output register is replaced by extracting bits from an end to the m-th bit, shifting the other bits toward the end by the extracted bits, and shifting a part from the end on the same side to the m-th bit of the digital data stored in the input register by Q-m bits to move the part into bits emptied by the shifting. Consequently, when the arithmetic unit is employed in a decoding device in an image processing system, the demultiplexing processing for codes can be performed at high speeds.

Furthermore, according to the present invention, in the further improved arithmetic unit, the output bit selecting means outputs a digital data comprising bits from the end on the Most Significant Bit side to the Q-m-th bit, which have values of bits of the second input data being arranged starting from the m+1-th bit from the Most Significant Bit side, respectively in order, and bits of the Q-m+1-th bit and following, which have values of bits of the first input data being arranged from the end on the Most Significant Bit side, respectively in order, as the Q-bit digital data. Therefore, the demultiplexing processing for codes from the end on the Most Significant Bit side can be performed at high speeds.

Furthermore, according to the present invention, in the further improved arithmetic unit, the output bit selecting means outputs a digital data comprising bits from the end on the Least Significant Bit side to the Q-m-th bit, which have values of bits of the second input data being arranged starting from the m+1-th bit from the end on the Least Significant Bit side, respectively in order, and bits of the Q-m+1-th bit and following, which have values of bits of the first input data being arranged from the end on the Least Significant Bit side, respectively in order, as the Q-bit digital data. Therefore, the demultiplexing processing for codes from the end on the Least Significant Bit side can be performed at high speeds.

Furthermore, according to the present invention, in the further improved arithmetic unit, the output bit selecting means uses as the control data, an operation mode, a shift direction, and a shift amount, in addition to the integer "m", and when the control data having the operation mode which indicates a mode of performing a first operation and the integer "m" is input, the output bit selecting means performs the above operation, and when the control data having the operation mode which indicates a mode of performing a second operation, the shift direction, and the shift amount is input, the output bit selecting means outputs a digital data which is obtained by shifting values of bits of the first input data in the shift direction and by the shift amount, as the Q-bit digital data. Consequently, by only inputting a prescribed control data, the arithmetic unit can also be employed as a shifter as in the prior art. As a result, the arithmetic unit enabling the high-speed demultiplexing processing can be made to have the versatility easily.

BEST MODE FOR CARRYING OUT THE INVENTION

Figure 1:
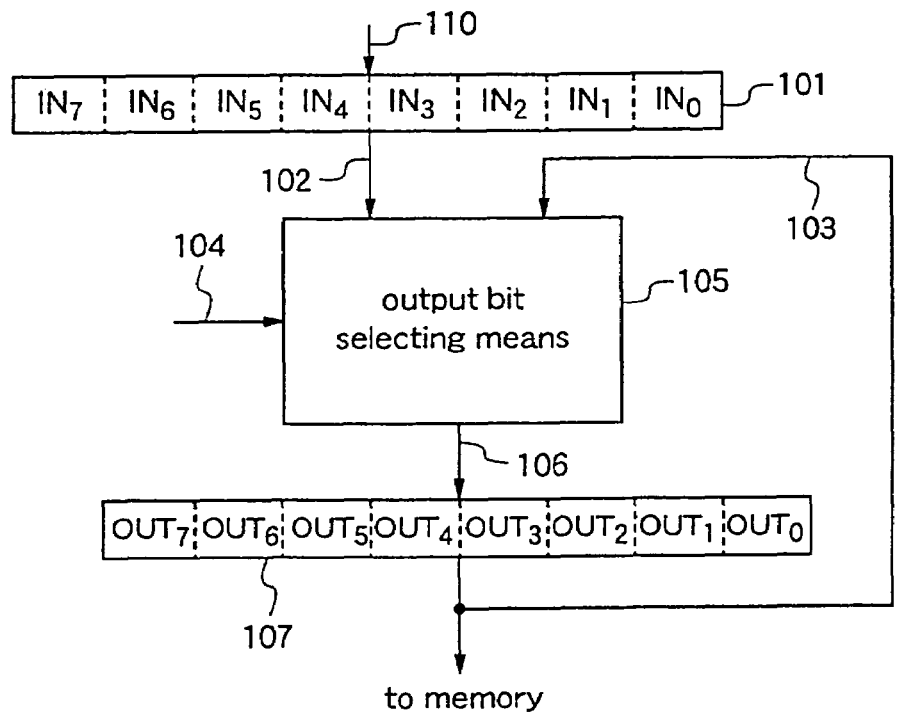
FIG. 1(a) is a block diagram illustrating a structure and an operation of an arithmetic unit according to a first embodiment of the present invention and showing a state before arithmetic is started.
FIG. 1(b) is a block diagram illustrating the structure and the operation of the arithmetic unit according to the first embodiment of the present invention and showing a state after the arithmetic is finished.
Figure 1:
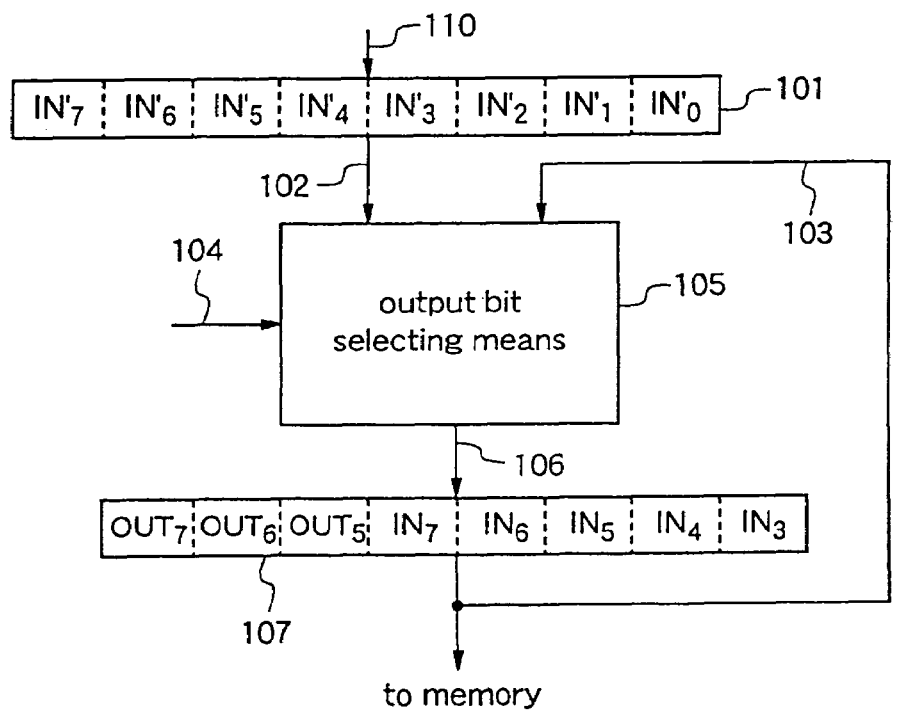

Hereinafter, in order to describe the present invention in more detail, embodiments of an arithmetic unit according to the present invention will be described with reference to the attached drawings.

EMBODIMENT 1

The first embodiment of the present invention shows an arithmetic unit employed in a bitstream transmitting circuit in a coding unit.

FIGS. 1(a) and 1(b) are block diagrams illustrating a structure and an operation of the arithmetic unit according to the first embodiment. FIG. 1(a) is a diagram showing a state before arithmetic is started and FIG. 1(b) is a diagram showing a state after the arithmetic is finished.

In these figures, the arithmetic unit comprises an 8-bit input register 101 for receiving data 110 including a code, an 8-bit output register 107 for outputting a multiplexed data to a memory (not shown) in a latter stage, and an output bit selecting means 105 for receiving an 8-bit digital data 102 which is output from the input register 101 as a first input data and an 8-bit digital data 103 which is output from the output register 107 as a second input data, selecting bits whose values are to be output, among bits of the first input data 102 and bits of the second input data 103, in accordance with a control data 104, and outputting an 8-bit digital data 106 comprising the values of the selected bits to the output register 107 as an output data.

Figure 9:
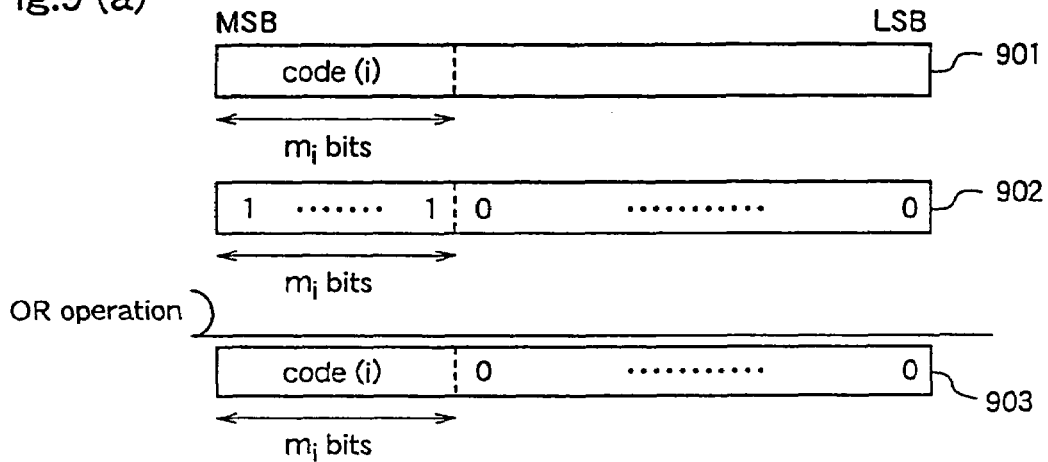
FIG. 9(a) is a diagram schematically illustrating multiplexing processing by software in a prior art image processing system and showing masking processing for a processing unit data including a code in a certain order.
FIG. 9(b) is a diagram schematically illustrating the multiplexing processing by software in the prior art image processing system and showing shifting processing for a processing unit data including a code in the next order.
FIG. 9(c) is a diagram schematically illustrating the multiplexing processing by software in the prior art image processing system and showing multiplexing processing for the code in the next order into the code in the certain order.
Figure 9:
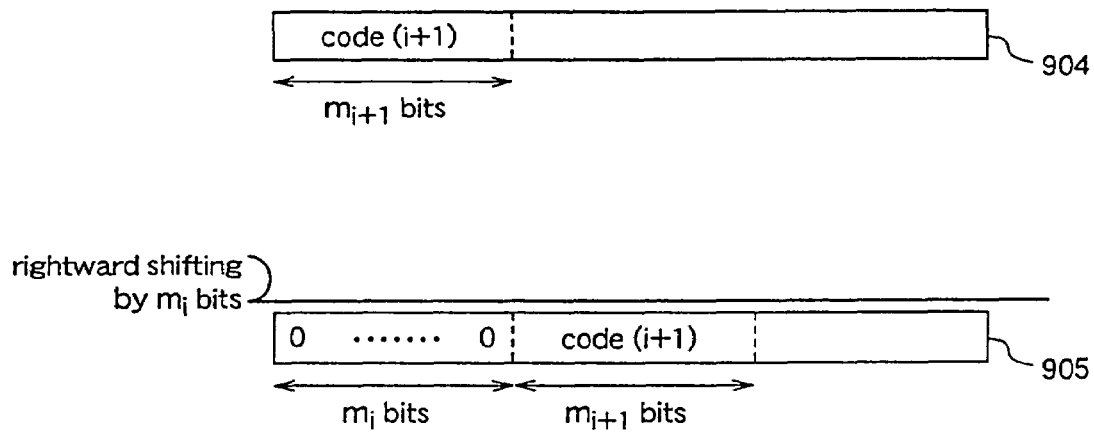
Figure 9:
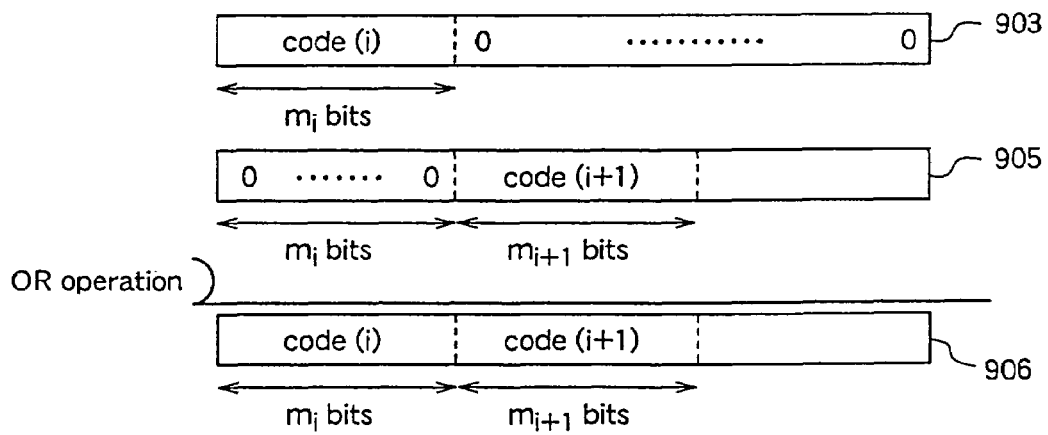

As described in the prior art (see FIG. 9(a)), data 110 from a processing unit having a prescribed bit length (8 bits in the first embodiment), which includes a code on the MSB side, is input to the input register 101 through other circuits (not shown) of the bitstream transmitting circuit. IN0 to IN7 and OUT0 to OUT7 denote values of respective bits from LSB to MSB, which are stored in the input register 101 and the output register 107, respectively, at a starting time of a cycle. In addition, IN'0 to IN'7 denote values of respective bits from LSB to MSB, which are stored in the input register 101 at a starting time of a next cycle.

Data including an operation mode and a residual code length, or an operation mode, a shift amount, and a shift direction is input as the control data 104 to the output bit selecting means 105 from a main control circuit (not shown) of the bitstream transmitting circuit.

Figure 2:
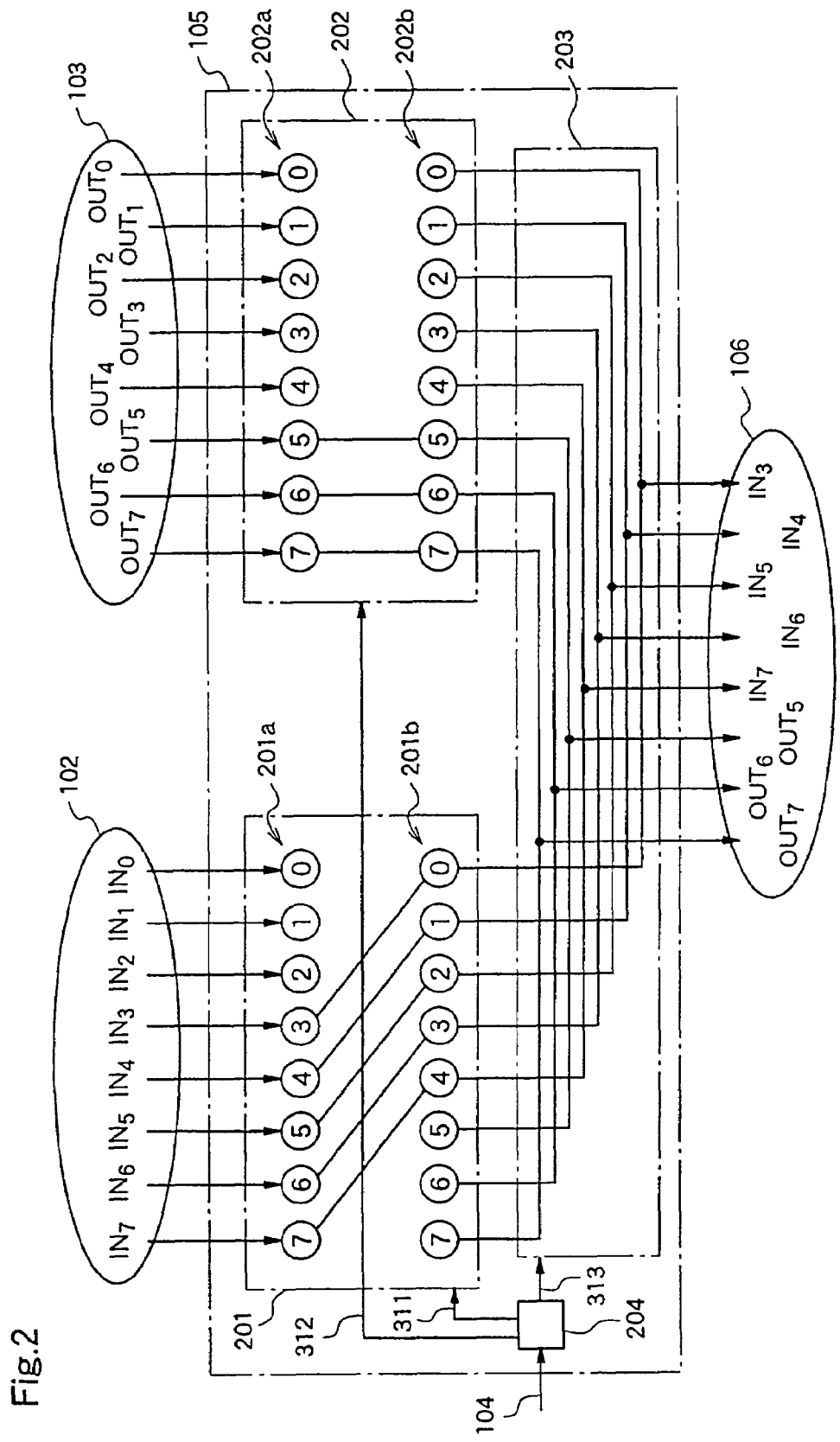
FIG. 2 is a circuit diagram illustrating a detailed structure of an output bit selecting means in the arithmetic unit of FIG. 1(a).

Next, a structure of the output bit selecting means 105 will be described in detail. FIG. 2 is a circuit diagram illustrating the structure of the output bit selecting means 105.

In the figure, the output bit selecting means 105 comprises a first bit selecting circuit 201, a second bit selecting circuit 202, an input data selecting circuit 203, and a selector control circuit 204.

The first bit selecting circuit 201 and the second bit selecting circuit 202 have 8 input terminals 201a and 202a and 8 output terminals 201b and 202b, respectively. Each of the 8 output terminals 201b in the first bit selecting circuit 201 can be connected to one of the 8 input terminals 201a, in accordance with a first selector control signal 311. Similarly, each of the 8 output terminals 202b of the second bit selecting circuit 202 can be connected to one of the 8 input terminals 202a, in accordance with a second selector control signal 312. Here, the numbers of 0 to 7 assigned to respective terminals of the input terminals 201a and 202a and the output terminals 201b and 202b in the first and second bit selecting circuits 201 and 202, denote positions of the bits of the 8-bit digital data which are input to the respective terminals or output from the respective terminals. Each of the input terminals 201a in the first bit selecting circuit 201 is connected to an output terminal (not shown) of a bit in a corresponding position of the input register. Each of the input terminals 202a in the second bit selecting circuit 202 is connected to an output terminal (not shown) of a bit in a corresponding position of the output register.

The input data selecting circuit 203 selects either of the output terminals of bits in corresponding positions of the output terminals 201b in the first bit selecting circuit 201 and the output terminals 202b in the second bit selecting circuit 202, for each of the output terminals of the bits in respective positions, in accordance with a third selector control signal 313, and connects the selected output terminal to an input terminal (not shown) of a bit in a corresponding position in the output register.

To simplify this figure, only the connections of the output terminals 201b and 202b to the input terminals 201a and 202a in the first bit selecting circuit 201 and the second bit selecting circuit 202, whose outputs are selected by the input data selecting circuit 203 as outputs to the input register, are shown by full lines. Since the connections of the output terminals 201b and 202b to the input terminals 201a and 202a except above-described terminals are not selected by the input data selecting circuit 203 as outputs, the-connections can be decided arbitrarily.

The selector control circuit 204 receives the control data 104 as an input. When the control data 104 is input, the selector control circuit 204 generates the first to third selector control signals 311 to 313 which make the output bit selecting means 105 perform an operation indicated by the control data 104. The selector control circuit 204 then outputs the generated selector control signals 311 to 313 to the first bit selecting circuit 201, the second bit selecting circuit 202, and the input data selecting circuit 203, respectively. That is, the selector control circuit 204 outputs the selector control signals 311 to 313, which control the connections of the output terminals to the input terminals in the first bit selecting circuit 201 and the second bit selecting circuit 202, and the selection of input sources for respective bits by the input data selecting circuit 203, so as to make the first bit selecting circuit 201, the second bit selecting circuit 202, and the input data selecting circuit 203 as a whole, output an output data required by the control data 104. Therefore, the arithmetic unit according to the first embodiment can select arbitrary values among values of the respective bits of the first input data and values of the respective bits of the second input data and combine the values, and output the combined values as output data, by inputting appropriate control data to the selector control circuit 204 in the output bit selecting means 105.

In the first embodiment, when a multiplexing operation (a first operation) is performed, data including an operation mode and a residual code length is input, and when a shifting operation (a second operation) is performed, data including an operation mode, a shift amount, and a shift direction is input, to the output bit selecting means 105 as the control data 104. In the output bit selecting means 105, the selector control circuit 204 outputs the selector control signals 311 to 313 which enable the first bit selecting circuit 201, the second bit selecting circuit 202, and the input data selecting circuit 203 to perform the operations indicated by the operation mode, the residual code length, the shift amount, and the shift direction of the control data 104.

FIG. 2 shows a case where the control data 104 including the operation mode and the residual code length is input to the output bit selecting means 105. In this case, the data having data indicating "multiplexing" as the operation mode and "m bits" as the residual code length is input as the control data 104. When the above-described control data 104 is input and assuming that m=3, in the first bit selecting circuit 201 in the output bit selecting means 105, the output terminals of bits from the 4(=m+1)th to the 8th bits from the end on the MSB side (the output terminals of 4-0) are connected to the input terminals of bits from the end on the MSB side to the 5th bit (the input terminals of 7-3), and outputs of these output terminals are selected by the input data selecting circuit 203 as outputs to the input terminals (not shown) of bits from the 4(=m+1)th to the 8th bits from the end on the MSB side in the input register. Further, in the second bit selecting circuit 202, the output terminals of bits from the end on the MSB side to the 3(=m)th bit (the output terminals of 7-5) are connected to the input terminals of bits from the end on the MSB side to the 3(=m)th bit (the input terminals of 7-5), and outputs of these output terminals are selected by the input data selecting circuit 203 as outputs to the input terminals (not shown) of bits from the end on the MSB side to the 3(=m)th bit in the input register.

Figure 11:
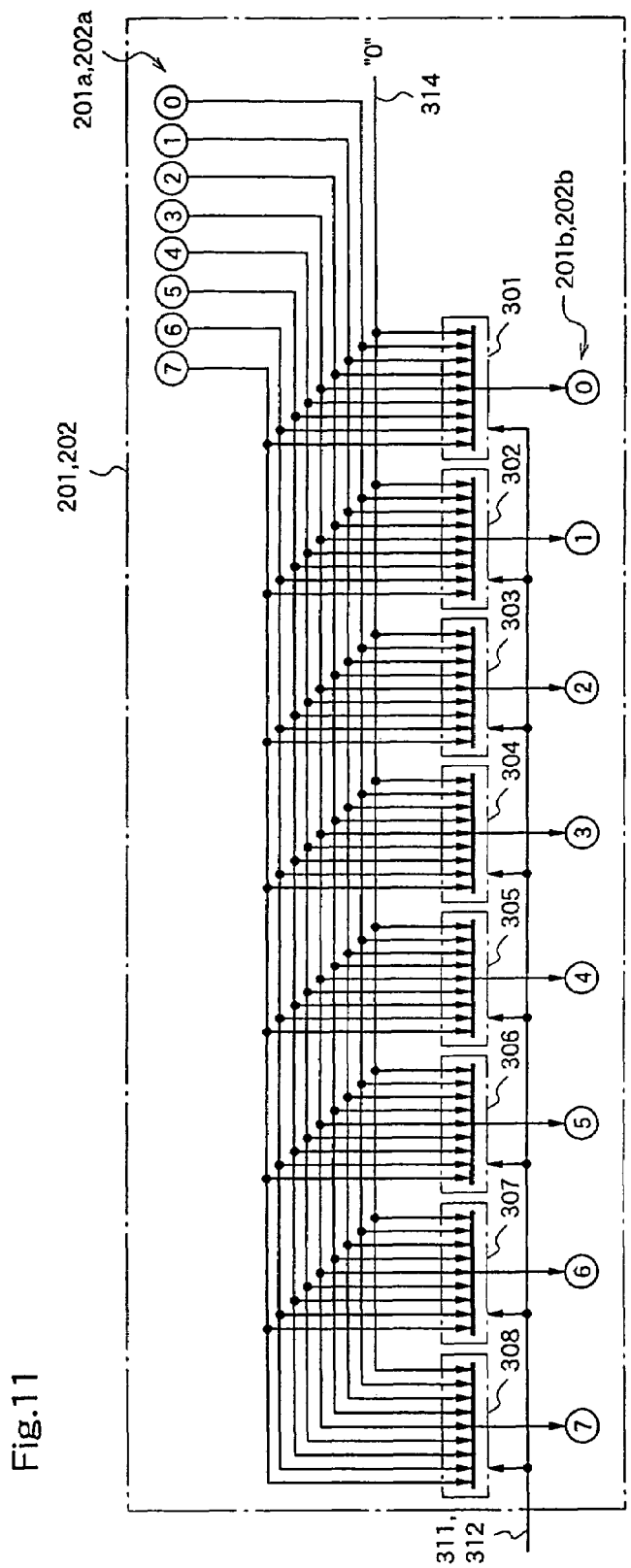
FIG. 11 is a circuit diagram illustrating a detailed structure of a first or second bit selecting circuit in the output bit selecting means of FIG. 2.

FIG. 11 is a circuit diagram illustrating a structure of the first bit selecting circuit and a second bit selecting circuit in the output bit selecting means.

In the figure, since the first bit selecting circuit 201 and the second bit selecting circuit 202 have the same structures, these are shown by a common figure. In addition, in the description for the figure, the first bit selecting circuit and the second bit selecting circuit are simply referred to as bit selecting circuits 201 and 202.

The bit selecting circuits 201 and 202 have 1st to 8th selectors 301 to 308, respectively. Each of the 1st to the 8th selectors 301 to 308 has nine input terminals and one output terminal, and the nine input terminals of each of the selectors 301 to 308 are connected to the input terminals 201*a* and 202*a* of the bit selecting circuits 201 and 202 and a "0" value input line 314, respectively. The output terminals of the 1st to the 8th selectors 301 to 308 are connected to 0 to 7 of the output terminals 201*b* and 202*b* in the bit selecting circuits 201 and 202, respectively. In addition, the selector control signals 311 and 312 are input to the 1st to the 8th selectors 301 to 308, and in accordance with the selector control signals 311 and 312, each of the selectors 301 to 308 connects the output terminal to one of the nine input terminals. Therefore, the bit selecting circuit 201 and 202 can connect one of the input terminals 201*a* and 202*a* and the "0" value input line 314 to one of the output terminals 201*b* and 202*b* by receiving the appropriate control signals 311 and 312, and thus arbitrarily select and combine values of the respective bits of the 8-bit digital data (here, the first input data or the second input data) which are input to the input terminals 201*a* and 202*a* or "0" values, and output the combined values from the output terminals 201*b* and 202*b* as a 8-bit digital data. In the first embodiment, this combination is performed so as to enable the multiplexing processing or shifting processing, and the selector control signals 311 and 312 enabling such a combination are input to the bit selecting circuits 201 and 202. Here, the "0" value input line 314 inputs a "0" value to an empty bit generated by the shifting when the arithmetic unit is made to operate as a shifter as in the prior art.

The input data selecting circuit 203 of FIG. 2 also has a structure similar to that of the bit selecting circuits 201 and 202 shown in FIG. 11. That is, the input data selecting circuit 203 has eight selectors corresponding to respective bits of an input data and an output data, and each of the eight selectors has two input terminals which are connected to an output terminal of the first bit selecting circuit 201 and an output terminal of the second bit selecting circuit 202, and one output terminal which is connected to the input terminal of the output register. The eight selectors select inputs from the first bit selecting circuit 201 or inputs from the second bit selecting circuit 202, respectively, in accordance with the third selector control signal 313, and output the selected inputs to the input register.

Figure 12:
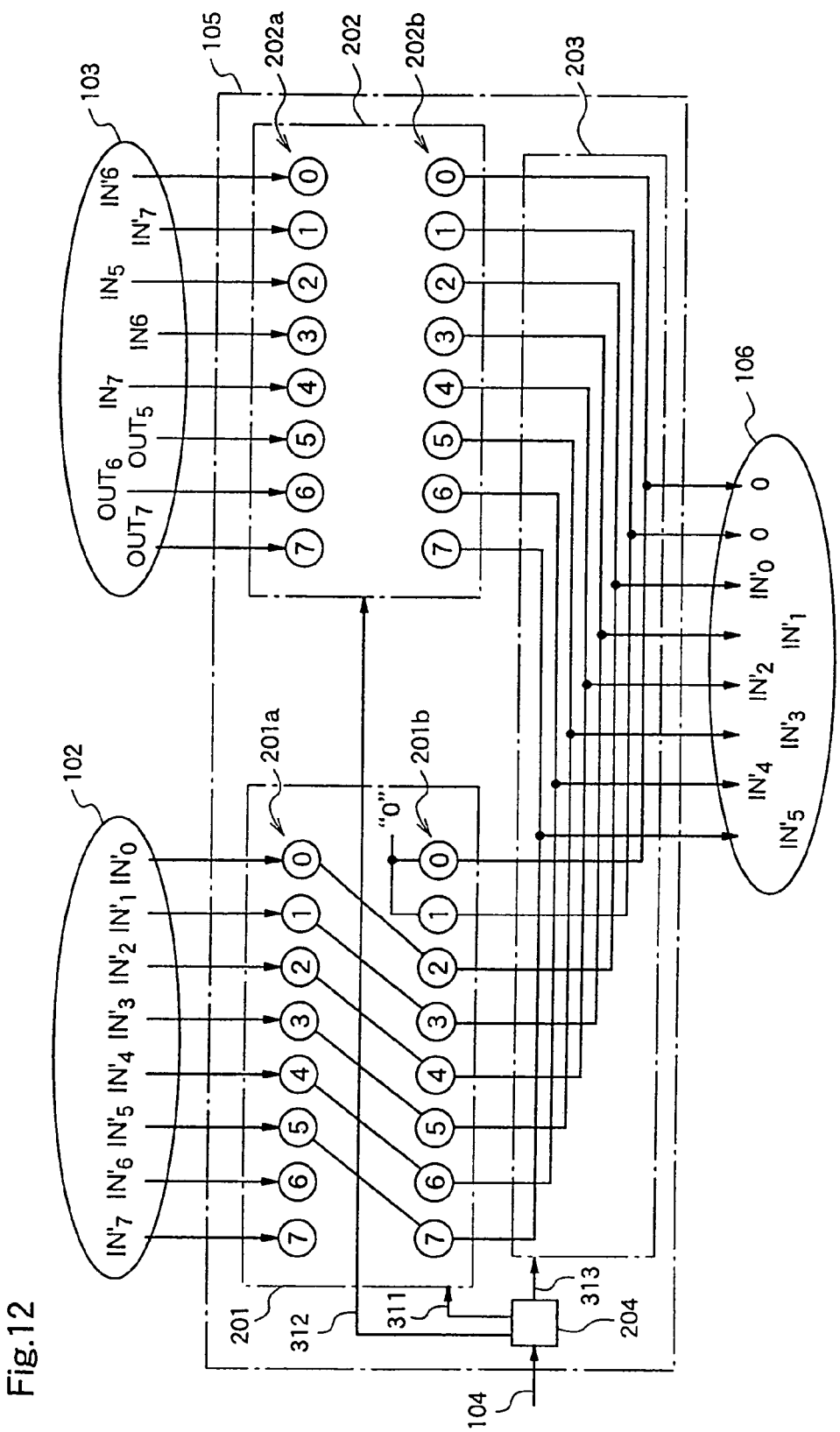
FIG. 12 is a circuit diagram illustrating a shifting operation by the output bit selecting means of FIG. 2.
Figure 13:
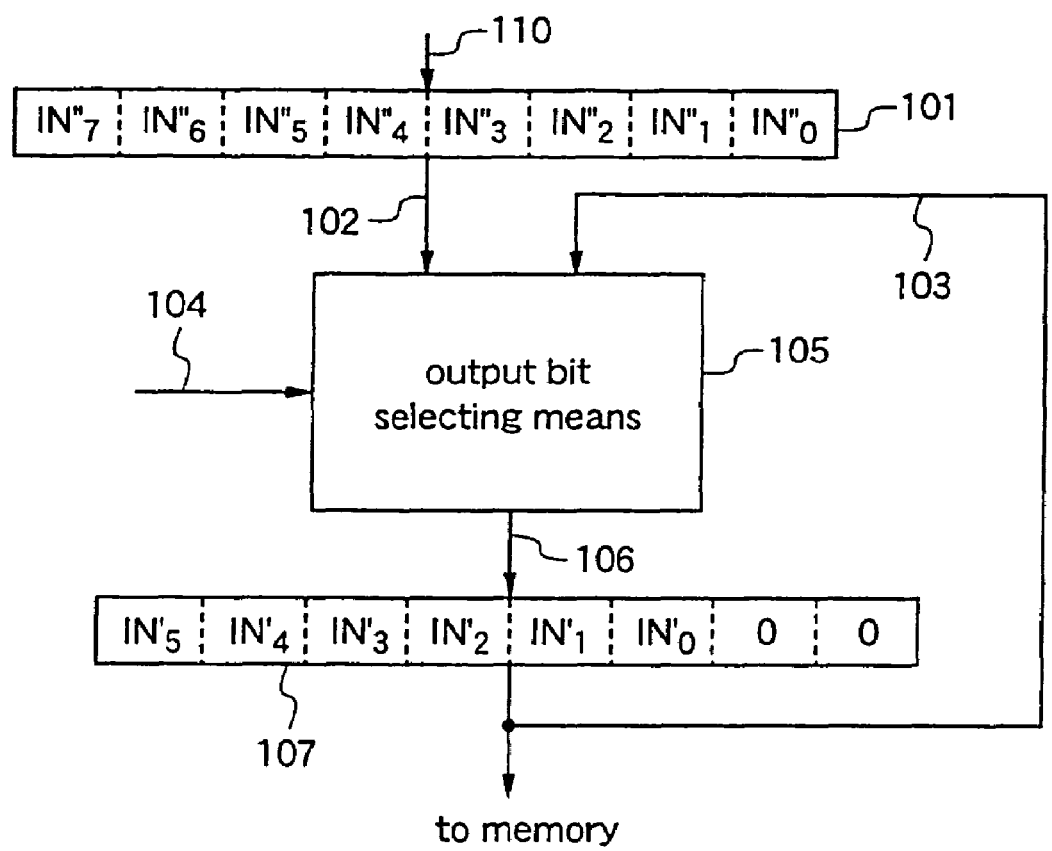
FIG. 13 is a circuit diagram illustrating a shifting operation by the arithmetic unit of FIG. 1(a).

FIGS. 12 and 13 are circuit diagrams illustrating a shifting operation by the arithmetic unit. FIG. 12 is a diagram showing a state while the shifting operation is being performed. FIG. 13 is a diagram showing a state after the shifting operation is performed.

In these figures, in the output bit selecting means 105, when the control data 104 indicating a shifting mode as the operation mode is input, the selector control circuit 204 outputs, to the first bit selecting circuit 201, the first selector control signal 311 which makes the first bit selecting circuit 201 shift the bits of the first input data in a direction and by an amount indicated by the control data 104 and output the shifted data, as well as the selector control circuits 204 outputs, to the input data selecting circuit 203, the third selector control signal 313 which makes the input data selecting circuit 203 select only inputs from the first bit selecting circuit 201 for all bits of an output data and output the same. In accordance with this first selector control signal 311, the first bit selecting circuit 201 shifts the first input data in the direction and by the amount indicated by the control data 104, and outputs the shifted data. In accordance with the third selector control signal 313, the input data selecting circuit 203 selects only inputs from the first bit selecting circuit 201, and outputs the same to the input register. The figure shows a case where the input data is shifted leftward by 2 bits, and "0" values are input to empty bits generated by the shifting. In addition, when the data is shifted rightward, a "0" value or a value of MSB is input to an empty bit generated by the shifting.

Next, an operation of the multiplexing processing by the arithmetic unit constructed as described above will be described with reference to FIGS. 1(*a*), 1(*b*), 2, 11, 12, and 13.

In these figures, OUT0 to OUT7, IN0 to IN7, IN'0 to IN'7, and IN"0 to IN'"7 denote an i-th word data, an i+1-th word data, an i+2-th word data, and an i+3-th word data, which are described in the prior art, respectively. Further, OUT0 to OUT7, IN0 to IN7, and IN'0 to IN'7 include codes having code lengths of 3 bits, 3 bits, and 4 bits, respectively.

Further, it is assumed that, in a timing of starting a cycle, the data of OUT0 to OUT7 is stored in the output register 107 and the data of IN0 to IN7 is stored in the input register 101, respectively, and thereafter the i+2-th word data and the i+3-th word data are successively input to the input register 101.

In the multiplexing processing, initially, in the state where a cycle is started as shown in FIG. 1(*a*), the control data 104 having an indication data which indicates "multiplexing" as the operation mode and "3 bits", corresponding to a code length of a code included in the data of OUT0 to OUT7 stored in the output register 107, as the residual code length, is input to the output bit selecting means 105 from the main control circuit.

Upon receipt of this input, in the output bit selecting means 105, the selector control circuit 204 outputs the first to third control signals 311 to 313 which make the first bit selecting circuit 201, the second bit selecting circuit 202, and input data selecting circuit 203 perform the following operations.

That is, in the first bit selecting circuit 201, the output terminals of the bits from the 4th to the 8th bits from the end on the MSB side are connected to the input terminals of the bits from the end on the MSB side to the 5th bit, and outputs of these output terminals are selected by the input data selecting circuit 203 as outputs to the input terminals of the bits from the 4th to the 8th bits from the end on the MSB side in the input register. In the second bit selecting circuit 202, the output terminals of the bits from the end on the MSB side to the 3rd bit are connected to the input terminals of the bits from the end on the MSB side to the 3rd bit, and outputs of these output terminals are selected by the input data selecting circuit 203 as outputs to the input terminals of the bits from the end on the MSB side to the 3rd bit of the input register. Thus, the data stored in the output register 107 is replaced with data having values of OUT7, OUT6, and OUT5 in this order in the bits from the end on the MSB side to the 3rd bit, and values of IN7, IN6, IN5, IN4, and IN3 in this order in the 4th to the 8th bits, respectively, whereby the code of the i+1-th word data is subjected to multiplexing into the code of the i-th word data.

When a next cycle is started, as shown in FIG. 1(b), the i+2-th word data is input to the input register 101. Then, the data stored in the input register 101 is replaced with the data of IN'7 to IN'0, as well as the control data 104 having an indication data indicating "multiplexing" as the operation mode and "6 bits", corresponding to a sum of both code lengths of the code of the i-th word data and the code of the i+1-th word data which are included in the data stored in the output register 107, as the residual code length, is input to the output bit selecting means 105 from the main control circuit.

Upon receipt of this input, the output bit selecting means 105, in the same way as in the above description, outputs data having values of OUT7, OUT6, and OUT5 in this order in the bits from the end on the MSB side to the 3rd bit, values of IN7, IN6, and IN5 in this order in the 4th to 6th bits, and values of IN'7 and IN'6 in this order in the 7th and 8th bits, whereby the data stored in the output register 107 is replaced with this data. Thus, the code of the i+1-th word data and a part (half) of the code of the i+2-th word data are subjected to multiplexing into the code of the i-th word data.

Since the output register 107 is filled with data obtained by multiplexing codes, this data is transferred to a memory in a next cycle.

When a next cycle is started, as shown in FIGS. 12 and 13, the control data 104 having an indication data indicating "shifting" as the operation mode, "leftward" as a shift direction, and "2 bits", corresponding to a bit length of the remaining part of the code of the i+2-th word data, as a shift amount, is input to the output bit selecting means 105 from the main control circuit.

Upon receipt of this input, in the output bit selecting means 105, the selector control circuit 204 outputs the first and the third control signals 311 and 313 which make the first bit selecting circuit 201 and the input data selecting circuit 203 perform the following operations.

That is, the first bit selecting circuit 201 shifts the first input data leftward by 2 bits and outputs the shifted input data. The input data selecting circuit 203 selects only inputs from the first bit selecting circuit 201 and outputs the same to the input register.

Thereby, the data of IN'7 to IN'0 stored in the input register 101 is shifted leftward by 2 bits, and data having values of IN'5, IN'4, IN'3, IN'2, IN'1, IN'0, 0, and 0 in this order from the end on the MSB side is stored in the output register 107.

Then, when a next cycle is started, the i+3-th word data is input to the input register 101 and hereafter the multiplexing processing is performed in the same way as in the above description.

As described above, in this first embodiment, the digital data stored in the output register 107 and the digital data stored in the input register 101 are combined in bit units in accordance with the control data 104, and the digital data 106 generated by that combination is output to the output register 107, and besides this operation can be performed in one cycle. Therefore, the multiplexing processing for codes can be performed at high speeds when the unit is employed in a coding device in an image processing system.

EMBODIMENT 2

The second embodiment of the present invention shows an arithmetic unit which is employed in a bitstream transmitting circuit in a coding device.

Figure 3:
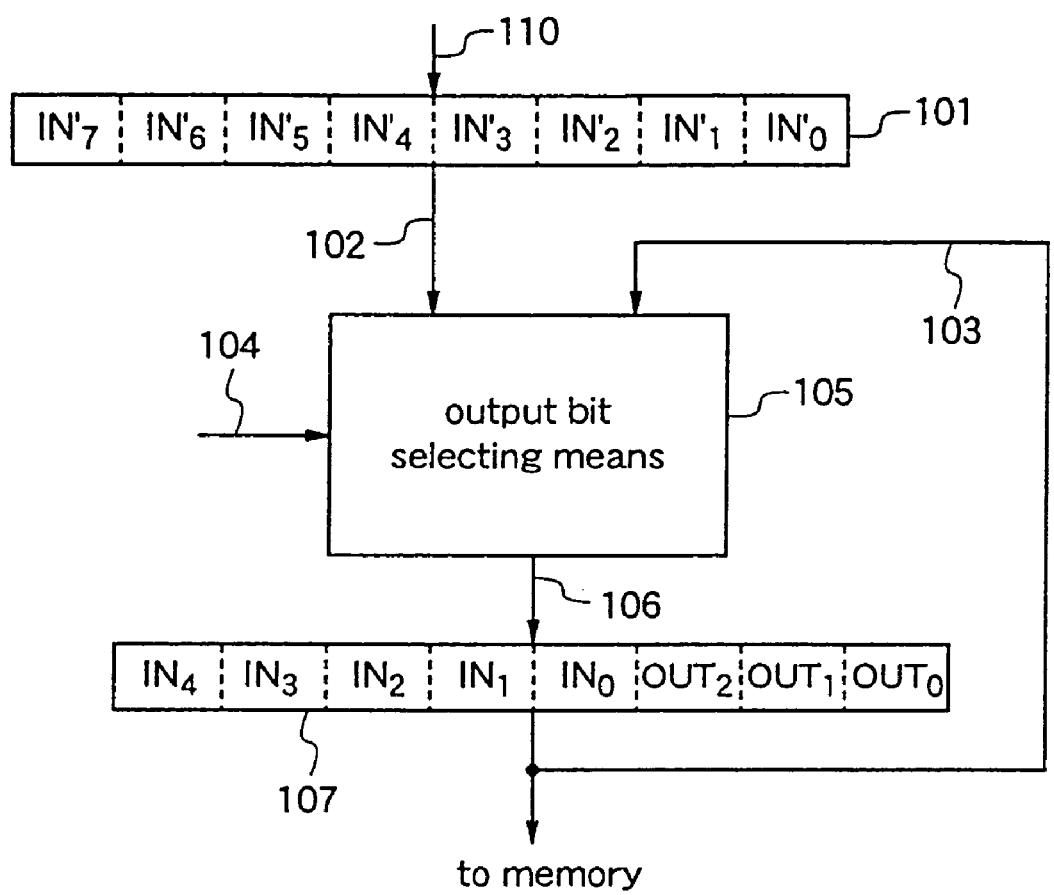
FIG. 3 is a block diagram illustrating a structure and an operation of an arithmetic unit according to a second embodiment of the present invention and showing a state after arithmetic is finished.
Figure 4:
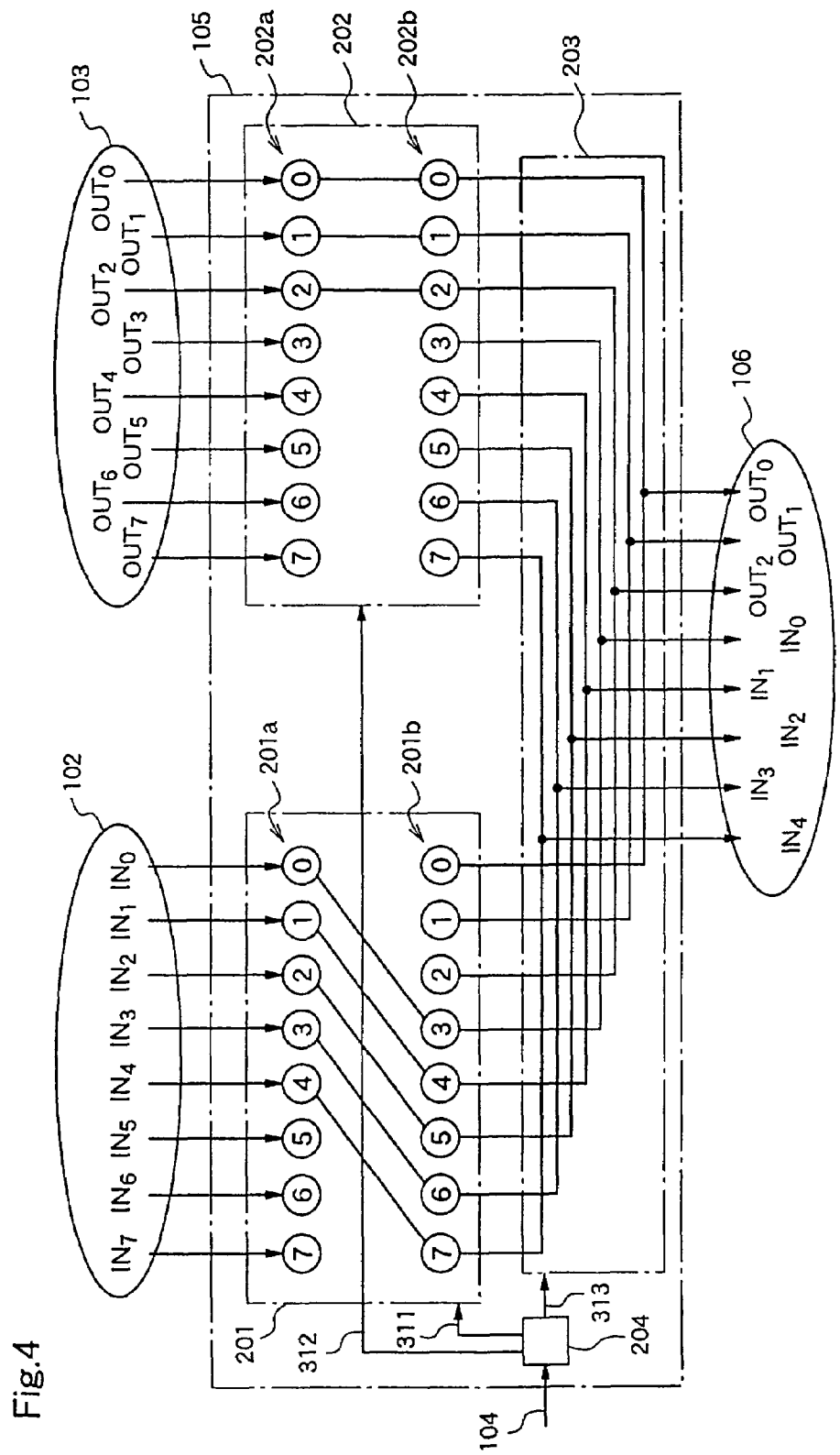
FIG. 4 is a circuit diagram illustrating a detailed structure of an output bit selecting means in the arithmetic unit of FIG. 3.

FIG. 3 is a block diagram illustrating a structure and an operation of the arithmetic unit according to the second embodiment, and showing a state after arithmetic is finished. FIG. 4 is a circuit diagram illustrating a detailed structure of an output bit selecting means in the arithmetic unit of FIG. 3.

In these figures, the same reference numerals as those in FIGS. 1(a), 1(b), and 2 denote the same or corresponding parts. In the arithmetic unit according to the second embodiment, data lo from a processing unit which is input to the input register 101 has a code at the end on the LSB side. Therefore, the second embodiment is different from the first embodiment in that data stored in the output register 107 is subjected to multiplexing from the end on the LSB side.

In the state shown in FIG. 1(a) of the first embodiment, when a control data 104 indicating "3 bits" as the residual code length is input to the output bit selecting means 105 from the main control circuit, in the output bit selecting means 105, the selector control circuit 204 outputs the first to the third control signals 311 to 313 which make the first bit selecting circuit 201, the second bit selecting circuit 202, and the input data selecting circuit 203 perform the following operations.

In the first bit selecting circuit 201, the output terminals of bits from the 4th to the 8th bits from the end on the LSB side are connected to the input terminals of bits from the end on the LSB side to the 5th bit, and the outputs of these output terminals are selected by the input data selecting circuit 203 as outputs to the input terminals of bits from the 4th to the 8th bits from the end on the LSB side in the input register. In the second bit selecting circuit 202, the output terminals of bits from the end on the LSB side to the 3rd bit are connected to the input terminals of bits from the end on the LSB side to the 3rd bit, and output of these output terminals are selected by the input data selecting circuit 203 as outputs to the input terminals of bits from the end on the LSB side to the 3rd bit in the input register. Thus, the data stored in the output register 107 is replaced with data having values of OUT0, OUT1, and OUT2 in this order in the bits from the end on the LSB side to the 3rd bit, and values of IN0, IN1, IN2, IN3, and IN4 in this order in the bits from the 4th to the 8th bits. In this way, the code of the i+1-th word data is subjected to multiplexing from the end on the LSB side into the code of the i-th word data.

Therefore, according to the second embodiment, the multiplexing processing for a code from the end on the LSB side can be performed at high speeds.

EMBODIMENT 3

The third embodiment of the present invention shows an arithmetic unit which is employed in a bitstream receiving circuit in a decoding device.

Figure 5:
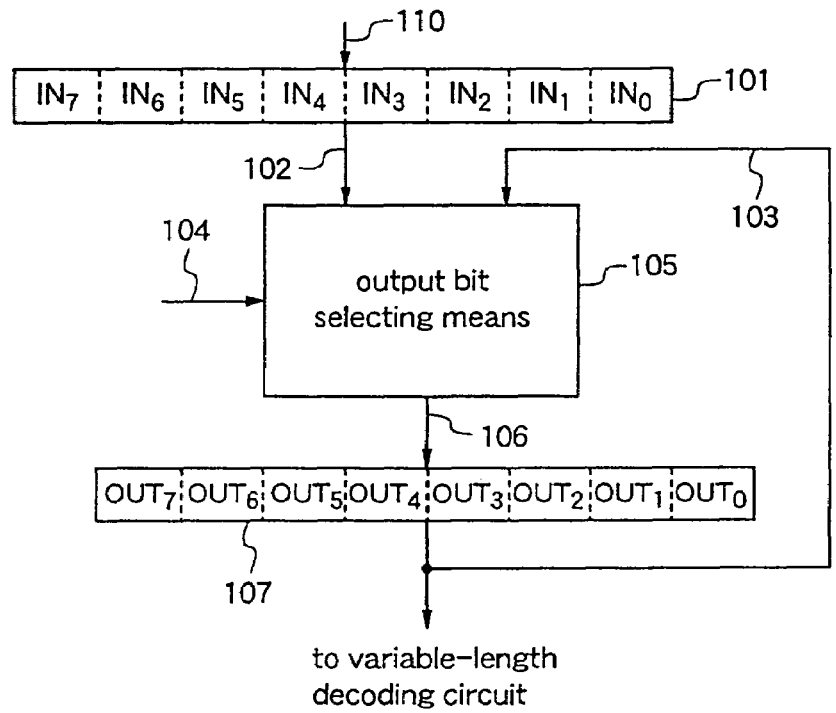
FIG. 5(a) is a block diagram illustrating a structure and an operation of an arithmetic unit according to a third embodiment of the present invention and showing a state before arithmetic is started.
FIG. 5(b) is a block diagram illustrating the structure and the operation of the arithmetic unit according to the third embodiment of the present invention and showing a state after the arithmetic is finished.
Figure 5:
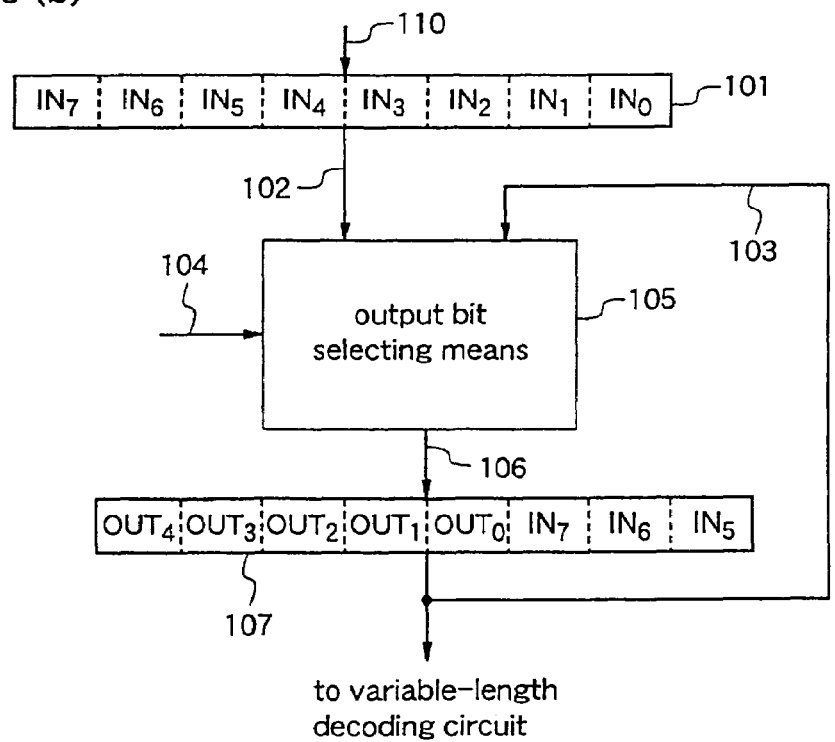

FIGS. 5(a) and 5(b) are block diagrams illustrating a structure and an operation of the arithmetic unit according to the third embodiment. FIG. 5(a) is a diagram showing a state before arithmetic is started and FIG. 5(b) is a diagram showing a state after the arithmetic is finished.

In the figures, the same reference numerals as those in FIGS. 1(a) and 1(b) denote the same or corresponding parts. The arithmetic unit according to the third embodiment is different from that of the first embodiment in that it is constructed to perform the demultiplexing processing.

Figure 10:
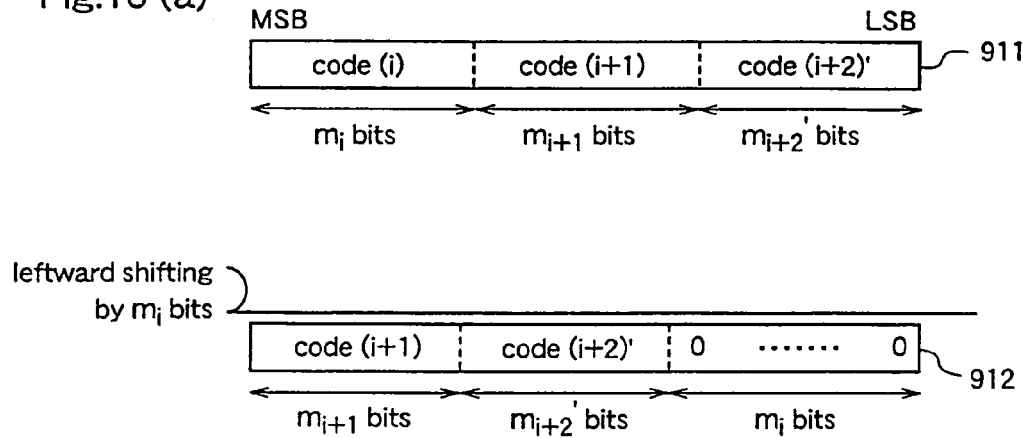
FIG. 10(a) is a diagram schematically illustrating demultiplexing processing by software in the prior art image processing system and showing processing of extracting a code in a certain order from a processing unit data.
FIG. 10(b) is a diagram schematically illustrating the demultiplexing processing by software in the prior art image processing system and showing shifting processing for a code of a next processing unit data.
FIG. 10(c) is a diagram schematically illustrating the demultiplexing processing by software in the prior art image processing system and showing data supplementation for the processing unit data after the code is extracted, with data from the next processing unit data.
Figure 10:
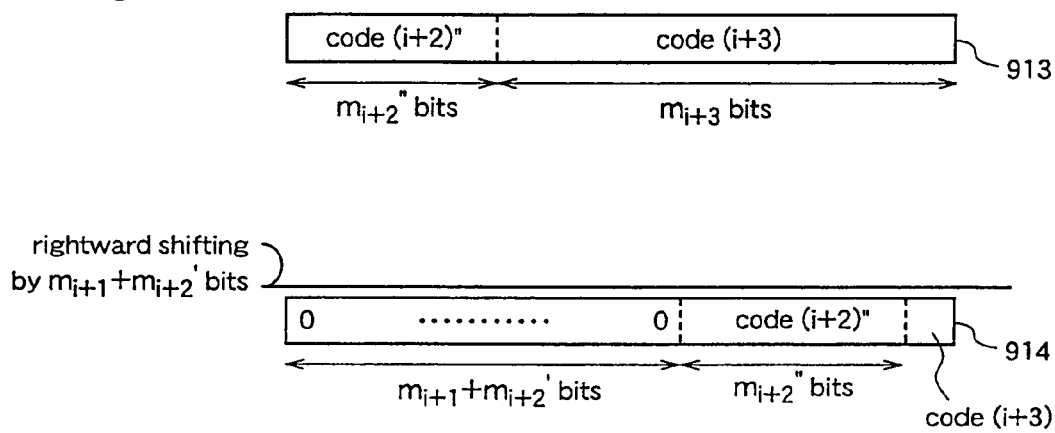
Figure 10:
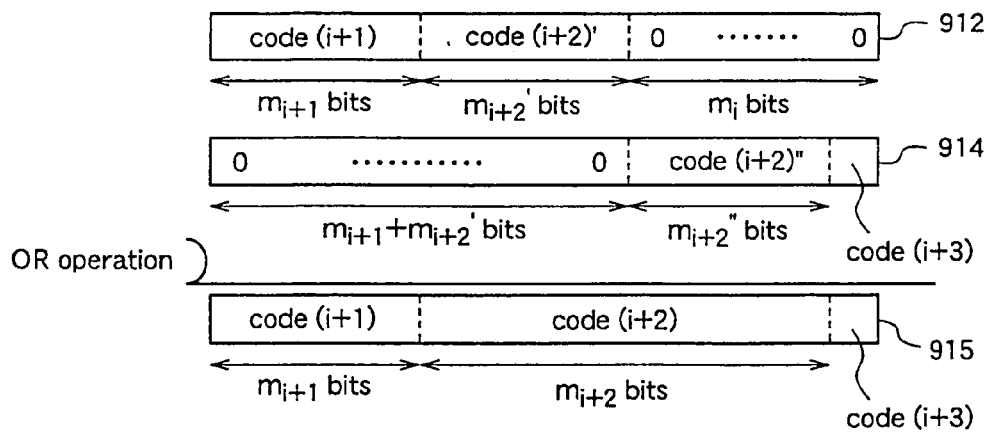

That is, as described in the prior art (see FIG. 10(a)), a bitstream 110 is input to the input register 101 through other circuits (not shown) of a bitstream receiving circuit. The input register 101 receives this bitstream 110, in a data unit having a prescribed bit length which corresponds to a storage capacity (8 bits in the third embodiment), so as to include codes to be subjected to demultiplexing successively from the MSB side. Then, the demultiplexing processing is performed in this data unit received by the input register 101.

In addition, the output register 107 is connected to a variable-length decoding circuit and a code situated at the end on the MSB side of a digital data stored in the output register 107 is variable-length decoded by the variable-length decoding circuit.

Further, to the output bit selecting means 105, data including an operation mode and a code length, or an operation mode, a shift amount, and a shift direction is input as a control data 104 from the main control circuit (not shown) in the bitstream receiving circuit.

Figure 6:
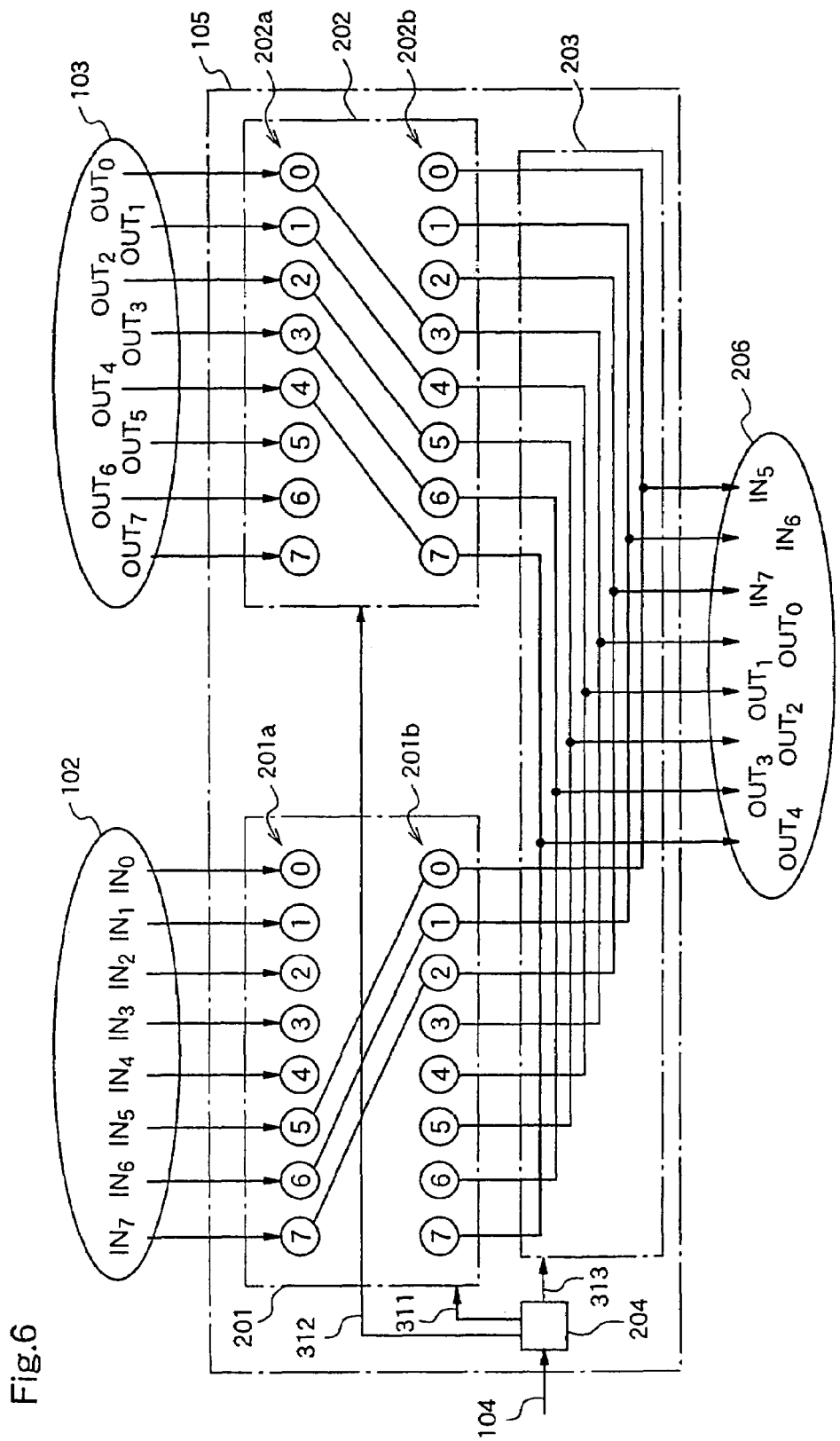
FIG. 6 is a circuit diagram illustrating a detailed structure of an output bit selecting means in the arithmetic unit of FIG. 5(a).

Next, a structure of the output bit selecting means 105 is described in detail. FIG. 6 is a circuit diagram illustrating a structure of the output bit selecting means 105 according to the third embodiment.

In the figure, the same reference numerals as those in FIG. 2 denote the same or corresponding parts.

When the demultiplexing operation (first operation) is performed, data including an operation mode and a code length is input to the output bit selecting means 105 as a control data 104. In this case, the control data 104 has an indication data indicating "demultiplexing" as the operation mode, and "m bits", corresponding to a code length of the code situated at the end on the MSB side in the output register, as the code length. In addition, when a shifting operation (second operation) is performed, data including an operation mode, a shift amount, and a shift direction is input as the control data 104.

When a control data having an indication data indicating "demultiplexing" as the operation mode and, for example, "3 bits" as the code length is input to the output bit selecting means 105, in the output bit selecting means 105, the selector control circuit 204 outputs the selector control signals 311 to 313 which allow the first bit selecting circuit 201, the second bit selecting circuit 202, and the input data selecting circuit 203 to perform the demultiplexing operation.

That is, in the second bit selecting circuit 202, the output terminals of bits from the end on the MSB side to the 5(=8−m)th bit are connected to the input terminals of bits from the 4(=m+1)th to the 8th bits from the end on the MSB side, and outputs of these output terminals are selected by the input data selecting circuit 203 as outputs to the input terminals (not shown) of bits from the end on the MSB side to the 5(=8−m)th bit in the input register. In the first bit selecting circuit 201, the output terminals of bits from the 6(=8−m+1)th to the 8th bits from the end on the MSB side are connected to the input terminals of bits from the end on the MSB side to the 3(=m)th bit, and outputs of these output terminals are selected by the input data selecting circuit 203 as outputs to the input terminals (not shown) of bits from the 6(=8−m+1)th to the 8th bits from the end on the MSB side in the input register.

Further, the operation when the control data 104 including the operation mode, the shift amount, and the shift direction is input to the output bit selecting means 105 is completely the same as that in the first embodiment.

Next, the description is given of an operation of the demultiplexing processing by the arithmetic unit constructed as described above, with reference to FIGS. 5(a), 5(b), and 6.

In these figures, OUT0 to OUT7, IN0 to IN7, and IN'0 to IN'7 (not shown) denote a j-th word data, a j+1-th word data, and a j+2-th word data, which are described in the prior art, respectively. The data of OUT0 to OUT7 has a code(i) having a code length of 3 bits, a code(i+1) having a code length of 3 bits, and a half of a code(i+2) having a code length of 4 bits in this order from the end on the MSB side. The data of IN0 to IN7 has the remaining half of the code(i+2) at the end on the MSB side.

In a timing of starting a cycle, the data of OUT0 to OUT7 is stored in the output register 107 and the data of IN0 to IN7 is stored in the input register 101, respectively, and hereafter data from the j+2-th word data are successively input to the input register 101.

In the demultiplexing processing, initially, in the state where a cycle is started as shown in FIG. 5(a), the code(i) situated at the end on the MSB side in the data of OUT0 to OUT7 which is stored in the output register 107 is decoded.

Then, the control data 104 having "demultiplexing" as the operation mode and "3 bits", corresponding to the code length of the code(i) situated at the end on the MSB side in the data of OUT0 to OUT7 which is stored in the output register 107, as the code length, is input to the output bit selecting means 105 from the main control circuit.

Upon receipt of this input, in the output bit selecting means 105, the selector control circuit 204 outputs the first to the third control signals 311 to 313 which make the first bit selecting circuit 201, the second bit selecting circuit 202, and the input data selecting circuit 203 perform the following operations.

That is, in the second bit selecting circuit 202, the output terminals of bits from the end on the MSB side to the 5th bit are connected to the input terminals of bits from the 4th to the 8th bits from the end on the MSB side, and outputs of these output terminals are selected by the input data selecting circuit 203 as outputs to the input terminals of bits from the end on the MSB side to the 5th bit in the input register. In the first bit selecting circuit 201, the output terminals of bits from the 6th to the 8th bits from the end on the MSB side are connected to the input terminals of bits from the end on the MSB side to the 3rd bit, and outputs of these output terminals are selected by the input data selecting circuit 203 as outputs to the input terminals of bits from the 6th to the 8th bits from the end on the MSB side in the input register. Thus, the data stored in the output register 107 is replaced with data having values of OUT4, OUT3, OUT2, OUT1, and OUT0 in this order in the bits from the end on the MSB side to the 5th bit, and values of IN7, IN6, and IN5 in this order in the bits from the 6th to the 8th bits. In this way, the code(i) is subjected to demultiplexing (extracted) from the j-th word data and empty bits in the j-th word data are supplemented with a part of the j+1-th word data (FIG. 5(b)).

Then, in a next cycle, among the data comprising OUT4, OUT3, OUT2, OUT1, OUT0, IN7, IN6, and IN5 which is stored in the output register 107, a part comprising OUT4, OUT3, and OUT2, which corresponds to the code(i+1) is decoded. Then, the control data 104 having "3 bits", corresponding to the code length of the code(i+1), is input as the code length and, in the same way as in the above description, the data stored in the output register 107 is replaced with data having values of OUT1, OUT0, IN7, IN6, IN5, IN4, IN3, and IN2 in this order from the end on the MSB side. Thereby, the code(i+1) is subjected to demultiplexing from the j-th word data and empty bits in the j-th word data are supplemented with a part comprising IN7, IN6, IN5, IN4, IN3, and IN2 of the j+1-th word data.

Then, in a next cycle, among the data comprising OUT1, OUT0, IN7, IN6, IN5, IN4, IN3, and IN2 which is stored in the output register 107, a part comprising OUT1 and OUT0, which corresponds to a half of the code(i+2), is decoded. Then, the control data 104 having "2 bits" corresponding to a half of the code length of the code(i+2) is input as the code length and, in the same way as in the above description, the data stored in the output register 107 is replaced with data having values of IN7, IN6, IN5, IN4, IN3, IN2, IN1, and IN0 in this order from the end on the MSB side. Thereby, the half of the code(i+1) is subjected to demultiplexing from the j-th word data and empty bits in the j-th word data are supplemented with the data of IN7, IN6, IN5, IN4, IN3, IN2, IN1, and IN0, which is the entire j+1-th word data.

Thereby, the j+1-th word data which is input to the input register 101 is emptied (all the data has moved to the output register 107). Then, the data of IN'0 to IN'7, which is the j+2-th word data, is input to the input register 101 in a next cycle.

Then, in a next cycle, among the data comprising IN7, IN6, IN5, IN4, IN3, IN2, IN1, and IN0 stored in the output register 107, a part comprising IN7 and IN6, which corresponds to the remaining half of the code(i+2), is decoded. Then, the control data 104 having a "2 bits", corresponding to the code length of the remaining half of the code(i+2), is input as the code length and, in the same way as in the above description, the data stored in the output register 107 is replaced with data having values of IN5, IN4, IN3, IN2, IN1, IN0, IN'7, and IN'6 in this order from the end on the MSB side. Thereby, the remaining half of the code(i+2) is subjected to demultiplexing from the j+1-th word data and empty bits in the j+1-th word data are supplemented with the part comprising IN'7 and IN'6 of the j+2-th word data.

Hereinafter, the demultiplexing processing will be performed in the same way as in the above description.

As described above, in this third embodiment, when the control data 104 having "m bits" as a code length is input, the 8-bit digital data stored in the output register 107 is replaced by bits from the end on the MSB side to the m-th bit being extracted and the other bits corresponding to the extracted bits being shifted toward the MSB side, and a part from the end on the MSB side to the m-th bit of the digital data stored in the input register 101 being shifted by 8-m bits to move the part into bits which are emptied by the shifting, and besides this operation is performed in one cycle. Therefore, the demultiplexing processing for codes can be performed at high speeds, when this is employed in a decoding device in an image processing system.

EMBODIMENT 4

The fourth embodiment of the present invention shows an arithmetic unit employed in a bitstream receiving circuit in a decoding device.

Figure 7:
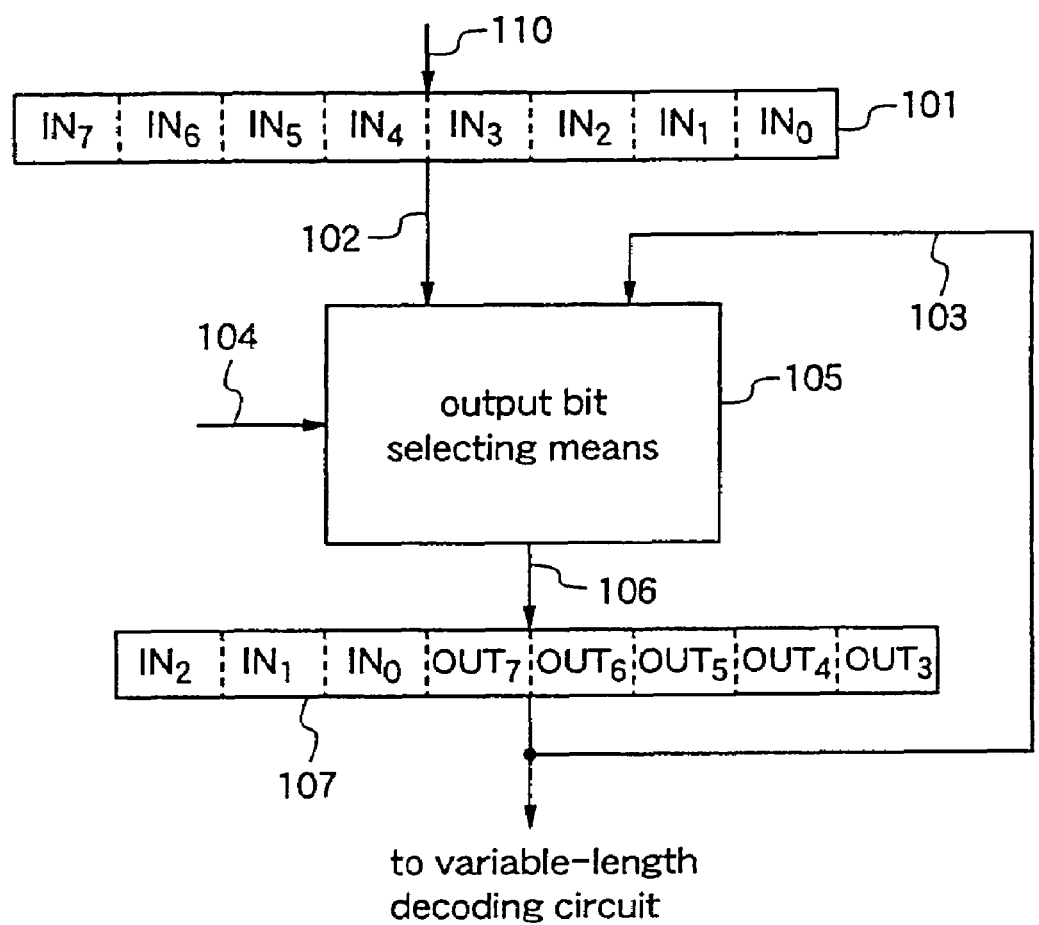
FIG. 7 is a block diagram illustrating a structure and an operation of an arithmetic unit according to a fourth embodiment of the present invention and showing a state after arithmetic is finished.
Figure 8:
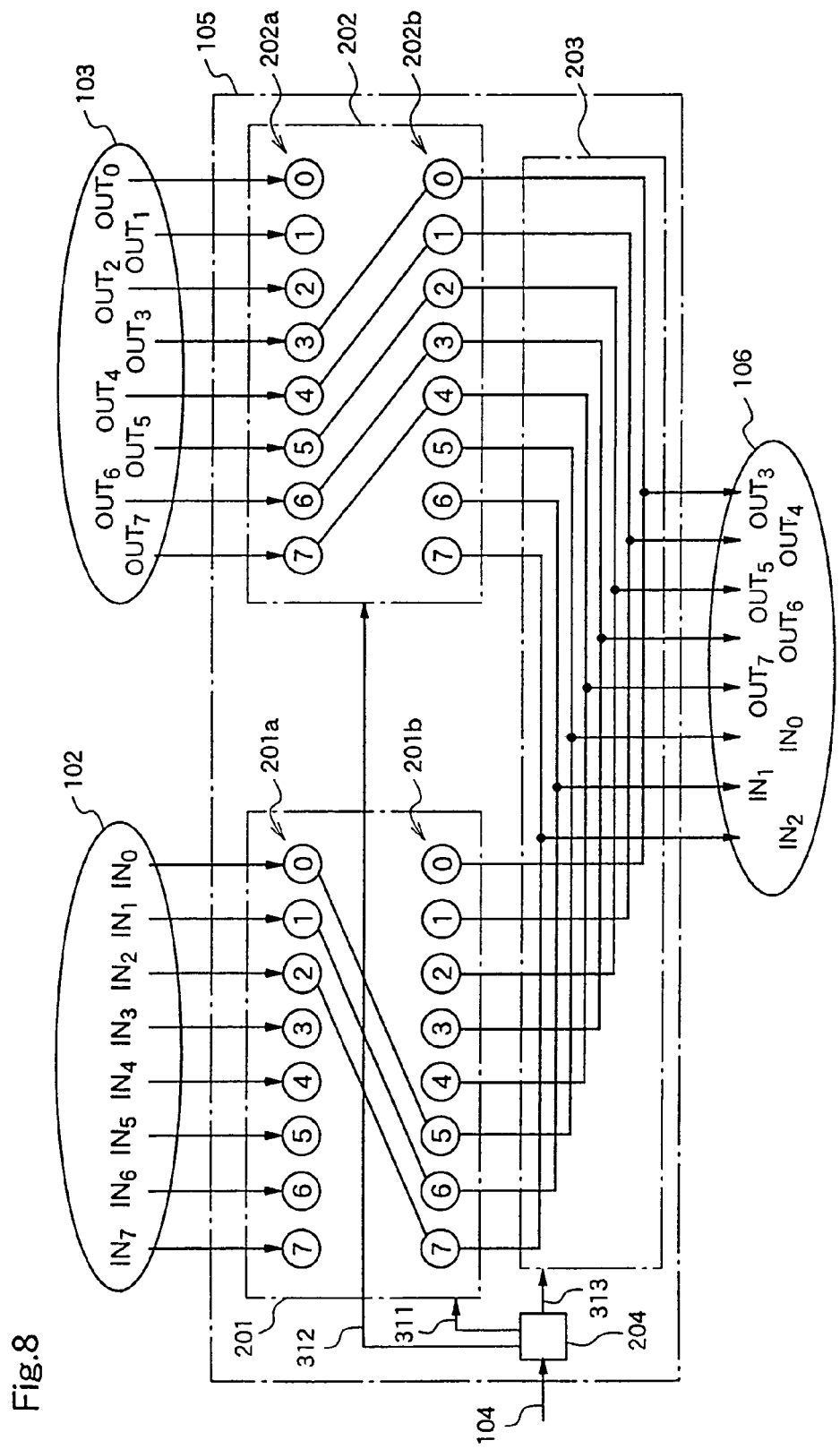
FIG. 8 is a circuit diagram illustrating a detailed structure of an output bit selecting means in the arithmetic unit of FIG. 7.

FIG. 7 is a block diagram illustrating a structure and an operation of the arithmetic unit according to the fourth embodiment, and showing a state after arithmetic is finished. FIG. 8 is a circuit diagram illustrating a detailed structure of an output bit selecting means in the arithmetic unit of FIG. 7.

In these figures, the same reference numerals as those in FIGS. 5(a), 5(b), and 6 denote the same or corresponding parts. The arithmetic unit according to the fourth embodiment is different from that in the third embodiment in that the input register 101 receives an input bitstream, including codes to be subjected to demultiplexing successively from the LSB side, and that a code situated at the end on the LSB side of the data stored in the output register 107 is variable-length decoded.

In a state shown in FIG. 5(a) in the third embodiment, when a control data having an indication data indicating "3 bits" as the code length is input to the output bit selecting means 105 from the main control circuit, in the output bit selecting means 105, the selector control circuit 204 outputs the selector control signals 311 to 313 which make the first bit selecting circuit 201, the second bit selecting circuit 202, and the input data selecting circuit 203 perform the following operations.

That is, in the second bit selecting circuit 202, the output terminals of bits from the end on the LSB side to the 5th bit are connected to the input terminals of bits from the 4th to the 8th bits from the end on the LSB side, and outputs of these output terminals are selected by the input data selecting circuit 203 as outputs to the input terminals of bits from the end on the LSB side to the 5th bit in the input register. In the first bit selecting circuit 201, the output terminals of bits from the 6th to the 8th bit from the end on the LSB side are connected to the input terminals of bits from the end on the LSB side to the 3rd bit, and outputs of these output terminals are selected by the input data selecting circuit 203 as outputs to the input terminals of bits from the 6th to the 8th bits from the end on the LSB side in the input register.

Thus, the data stored in the output register 107 is replaced with data having values of OUT3, OUT4, OUT5, OUT6, and OUT7 in this order in the bits from the end on the LSB side to the 5th bit, and values of IN0, IN1, and IN2 in this order in the bits from the 6th to the 8th bits. The code(i) is subjected to demultiplexing from the j-th word data and empty bits in the j-th word data are supplemented with a part of the j+1-th word data (FIG. 7).

Therefore, according to the fourth embodiment, the demultiplexing processing for codes from the end on the LSB side can be performed at high speeds.

In the first to the fourth embodiments, the bit length of the first input data is the same as the bit length of the output data. However, the bit length of the first input data can be different from the bit length of the output data.

In addition, while the arithmetic unit is used for the multiplexing processing in the first and the second embodiments, the purpose of the arithmetic unit is not limited to this. For example, when two kinds of 8-bit length image data are to be combined and stored in a 16-bit length image memory in an image processing apparatus, the arithmetic unit can be used for processing of combining the two kinds of 8-bit length image data. Further, while the arithmetic unit is used for the demultiplexing processing in the third and the fourth embodiments, the purpose of the arithmetic unit is not limited to this. For example, when a 16-bit length image data stored in the image memory is to be output and demultiplexed into two kinds of 8-bit length image data in the image processing apparatus, the arithmetic unit can be used for the demultiplexing processing for the 16-bit length image data.

Figure 14:
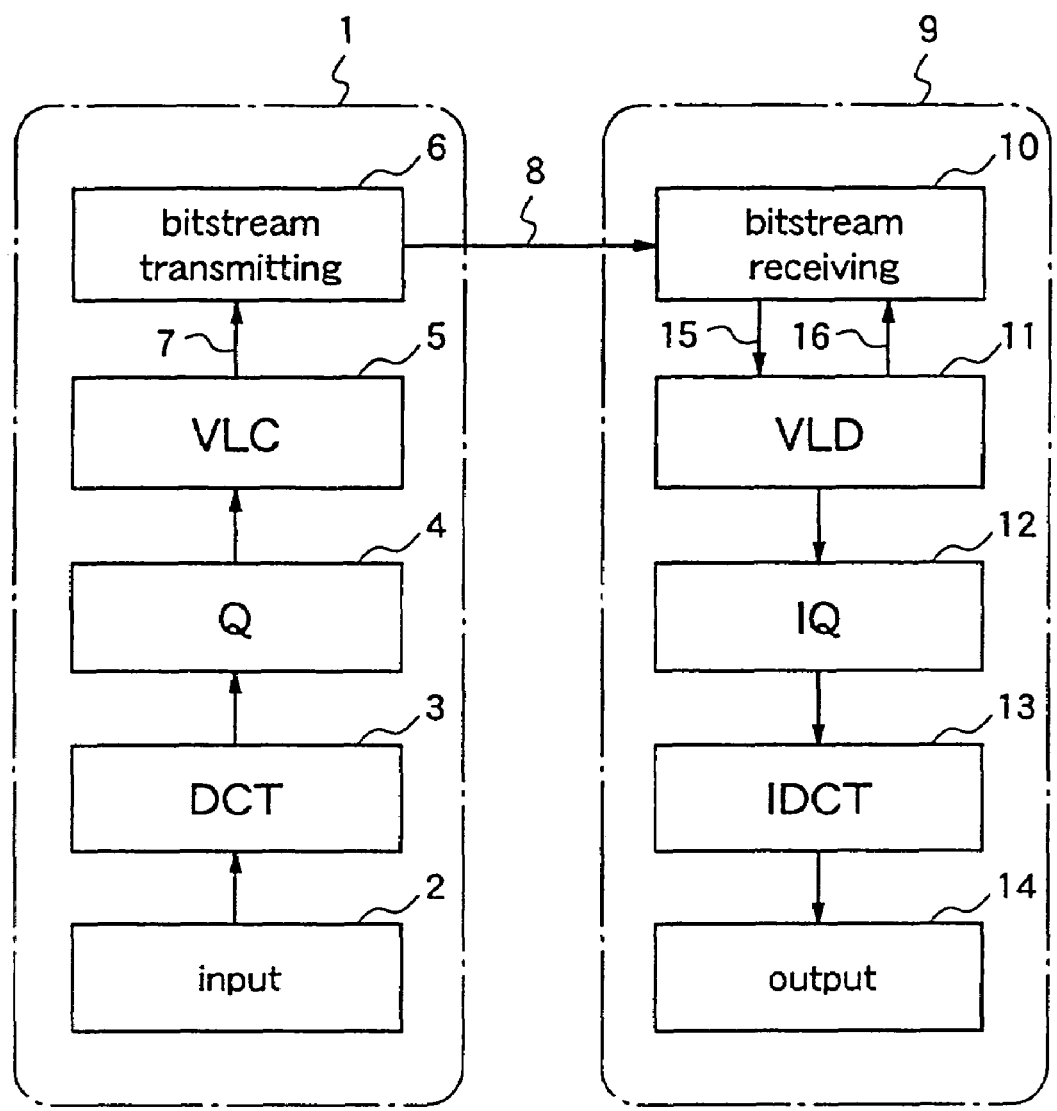
FIG. 14 is a block diagram illustrating a structure of a prior art image processing system.

Further, the arithmetic units according to the first to the fourth embodiments can be employed as a prior art shifter and for example can be employed as a shifter in the respective circuits 3 to 5 and 11 to 13 in the coding device 1 and the decoding device 9 shown in FIG. 14. In this case, as described in the first to the fourth embodiments, the arithmetic unit can be made to operate as a shifter by inputting a prescribed control data. In this way, the arithmetic units according to the first to the fourth embodiments can be employed as a prior art shifter, thereby realizing the versatility.

INDUSTRIAL AVAILABILITY

As described above, the arithmetic unit according to the present invention is useful as an arithmetic unit which performs multiplexing processing for codes and the demultiplexing processing for codes in an image processing system, and particularly suitable for use in an image processing system requiring a high-speed processing.

The invention claimed is:

1. A decoding unit for decoding coded image data, said decoding unit comprising:
   a bitstream receiving unit for receiving coded image data from an encoding unit, and outputting output data;
   a variable length decoding unit for performing variable length decoding on the output data; and
   an output unit coupled to said variable length decoding unit for outputting decoded image data,
   wherein said bitstream receiving unit includes:
      a first register for storing a first data comprising a lower part and a higher part; and
      a second register for storing a second data comprising a lower part and a higher part, and
   wherein said bitstream receiving unit outputs the higher part of the first data as a lower part of the output data and outputs the lower part of the second data as a higher part of the output data in one cycle, without the lower part of the first data and the higher part of the second data being output as part of the output data in one cycle.

2. The decoding unit of claim 1, wherein a shifted lower part of the second data comprises the lower part of the second data.

3. A decoding method for decoding coded image data, said decoding method comprising:
   storing, using a bitstream receiving unit, coded image data from an encoding unit, the coded image data including a P-bit length data and a Q-bit length data;
   outputting, using the bitstream receiving unit, a processed data having a higher part and a lower part in one cycle;
   decoding, using a variable length decoding unit, the processed data; and
   outputting, using an output unit, decoded image data,
   wherein the lower part of the processed data comprises a higher part of the P-bit length data,
   wherein the higher part of the processed data comprises a lower part of the Q-bit length data,
   wherein the higher part of the P-bit length data is m bits in length,
   wherein the lower part of the Q-bit length data is n bits in length,
   wherein a bit length of the P-bit length data, the Q-bit length data and the processed data are equal to m+n bits in length, and
   wherein the lower part of the P-bit length data and the higher part of the Q-bit length data are not output by the bitstream receiving unit as part of the processed data in one cycle.

4. The decoding method of claim 3, wherein a shifted lower part of the Q-bit length data comprises the lower part of the Q-bit length data.

5. A decoding unit for decoding coded image data, said decoding unit comprising:
   a bitstream receiving unit for receiving coded image data from an encoding unit, and outputting a processed data having a higher part and a lower part in one cycle;
   a variable length decoding unit for performing variable length decoding on the processed data; and
   an output unit coupled to said variable length decoding unit for outputting decoded image data,
   wherein said bitstream receiving unit includes:
      a first register for storing a first data comprising a lower part and a higher part; and
      a second register for storing a second data comprising a lower part and a higher part,
   wherein the lower part of the processed data comprises the higher part of the first data,
   wherein the higher part of the processed data comprises the lower part of the second data, and
   wherein the lower part of the first data and the higher part of the second data are not output by said bitstream receiving unit as part of the processed data in one cycle.

6. The decoding unit of claim 5,
   wherein a bit length of the first data is equal to P-bit length data,
   wherein a bit length of the second data is equal to Q-bit length data,
   wherein the higher part of the P-bit length data is m bits in length,
   wherein the lower part of the Q-bit length data is n bits in length, and
   wherein a bit length of the P-bit length data, the Q-bit length data and the processed data are equal to m+n bits in length.

7. The decoding unit of claim 6, wherein m+n bits are a multiple of 8.

8. The decoding unit of claim 7, wherein a shifted lower part of the Q-bit length data comprises the lower part of the Q-bit length data.

* * * * *